United States Patent [19]
Hermann

[11] Patent Number: 5,555,070
[45] Date of Patent: Sep. 10, 1996

[54] METHOD AND DEVICE FOR CONTROLLING EXPOSURE FOR FLUORESCENCE MICROPHOTOGRAPHY

[75] Inventor: Frank Hermann, Siegen, Germany

[73] Assignee: Leica Mikroskopie und Systeme GmbH, Wetzlar, Germany

[21] Appl. No.: 107,141

[22] Filed: Aug. 17, 1993

[30] Foreign Application Priority Data

Sep. 14, 1992 [DE] Germany ............................ 42 30 724.4

[51] Int. Cl.$^6$ ........................................................ G03B 7/00
[52] U.S. Cl. .............................................. 354/412; 354/79
[58] Field of Search ............................... 354/412, 79

[56] References Cited

U.S. PATENT DOCUMENTS

| | | | |
|---|---|---|---|
| 4,174,159 | 11/1979 | Kraft et al. | 354/79 |
| 4,318,599 | 3/1982 | Elger | 354/79 |
| 4,519,692 | 5/1985 | Michalik | 354/412 |
| 4,573,195 | 2/1986 | de France | 382/6 |
| 4,837,595 | 6/1989 | Leiter et al. | 354/412 |
| 5,239,171 | 8/1993 | Takabayashi et al. | 354/79 |

FOREIGN PATENT DOCUMENTS

| | | |
|---|---|---|
| 3627354A1 | 1/1988 | Germany. |
| WO88/00714 | 1/1988 | WIPO. |

OTHER PUBLICATIONS

Patent Abstracts of Japan, vol. 017, No. 163 (P–1513), Mar. 1993.

Patent Abstracts of Japan, vol. 016, No. 355 (P–1394), Jul. 30, 1992.

Patent Abstracts of Japan, vol. 02, No. 154 (E–80), Dec. 25, 1978.

H. Storz, "Anmerkungen zur Fluoreszenzmikrofotografie," Jenaer Rundschau, Nr. 2, 1983, Jena pp. 79–81.

H. Storz, "Untersuchungen zum Ausbleichen von Immunfluoreszenzobjekten und von Möglichkeiten zur Beeinflussung dieses Effektes," Nr. 3, 1981, Jena, pp. 87–88.

*Primary Examiner*—Russell E. Adams
*Attorney, Agent, or Firm*—Foley & Lardner

[57] ABSTRACT

In photographic recordings made by fluorescence microscopy, it is possible for a bleaching out of the preparation to occur, associated with a loss of fluorescence intensity. This so-called "fading" demands an exposure time correction. Where there is a decrease of the light intensity which obeys a known function, exposure takes place over a first exposure time $T_1$ derived from the light intensity $I_1$ measured prior to the exposure. The exposure process is then interrupted, and a further intensity $I_2$ is measured. Then, if required, exposure takes place over a further exposure time $T_2$, computed from $I_1$, $I_2$ and $T_1$. In this way, in each instance, all of the light of the photographic beam path passes both to the sensor for measurement for measuring intensities and also to the film for exposure. To deflect the photographic beam path, a rotatable mirror is disposed in the beam path, which mirror is controllable by means of a central processor, in the same manner as a shutter. An apparatus for carrying out this photographic process is described.

11 Claims, 2 Drawing Sheets

METHOD AND DEVICE FOR CONTROLLING EXPOSURE FOR FLUORESCENCE MICROPHOTOGRAPHY

BACKGROUND OF THE INVENTION

The instant invention relates to fluorescence microphotography and more particularly to a method for controlling exposure in fluorescence microphotography and a device for carrying out the method of exposure control.

In order to measure the exposure time for micro-photographic recordings, at least part of the light emitted by the microscope image must be deflected onto a sensor. Conventionally two different methods have been employed to measure exposure time. In the first method, prior to exposure of the photographic film, a mirror is swung into the beam path and directs the light onto the sensor. Then, in a manner similar to a reflex camera, the mirror is swung out of the beam path for the exposure time. This method is characterized in that the maximum quantity of available light is used both by the sensor to measure intensity to determine exposure time and is directed to the film during exposure.

The second known method uses a beam splitter which directs a portion of the beam to the sensor and at the same time directs the remaining portion of the beam to the photographic film plane. The beam splitter has a specified splitter ratio which enables the intensity of the portion of the beam incident upon the film to be calculated from the intensity of the portion of the beam incident upon the sensor. This method has the advantage that the light intensity can be measured continuously during the exposure of the film.

Each of the above described methods are disadvantageous when applied to fluorescence microphotography. In fluorescence microscopy a bleaching out of the preparation (i.e., the object caused to emit visible light as a result of the incidence of ultraviolet radiation) occurs over time. This "fading" or fading effect requires that a correction be made to the exposure time. As a result, the first conventional method cannot be effectively used since the exposure time is measured only once with respect to the initial intensity. This single measurement cannot take into account the fading effect and thus, a correction for the fading cannot be made. Alternatively, correction of the exposure time can be made when fluorescence microphotography is to be performed using the second method, since exposure is continuously measured using the beam splitter. However, since the beam splitter directs only a part of the available quantity of light to the film, according to the splitter ratio, long exposure times are required. Further, the imaging performance is reduced by passing the beam through the beam splitter.

A single device by which both of the above alternative methods can used is disclosed in International Patent Application No. Ser. No. 88/00,714. In this device, a beam splitter system with splitter surfaces of differing transmission/reflection ratios and with a supplementary fully mirrored surface is disposed in the photographic beam path so as to be transversely displaceable. A rotatable mirror is provided in the measurement beam path ahead of the light receiver. While this device provides for the optional use of either of the above two methods, the device still has the above described drawbacks with respect to fading effect when conducting fluorescence microphotography.

Therefore, it is an object of the present invention to provide a method and apparatus for controlling the exposure of a photographic film during fluorescence microphotography which overcomes the above described drawbacks by providing a fading correction while maintaining maximum light intensity for exposure and, thus, short exposure times.

It is another object of this invention to provide a method and apparatus which is able to correct for the fading effect associated with fluorescence microphotography while maintaining high quality imaging performance.

SUMMARY OF THE INVENTION

In the present invention a method is provided for controlling exposure during a microphotographic process of an object which has a luminous intensity which changes over time. The method comprises the steps of: directing a beam of the image to a sensor to measure a first intensity value of the beam; determining from the first intensity value a first exposure time and directing the photographic beam onto the photographic film for the first exposure time; directing the beam a second time to sensor to measure a second intensity value; determining whether any additional exposure is required using the first and second intensity values; and calculating a second exposure time, if necessary, using the first intensity value, the first exposure time and the second intensity value and exposing the film for the required additional exposure. This process may be repeated any number of times until a correct total exposure has been achieved. The instant invention is particularly useful for performing microphotography on fluorescent objects which have a known fading progression.

The instant invention is also directed to an apparatus for carrying out the above described control over an exposure process of a photographic film. In its most preferred embodiment, the apparatus comprises: a photographic tube to direct an image of the object along a photographic beam path to a movable mirror plane where a movable mirror is located; a shutter disposed between the moveable mirror and the photographic film; a sensor to measure the light intensity of the beam carrying the object image; and a central processor which controls the movable mirror and shutter and receives the intensity output from the sensor and moves the movable mirror to a first position to direct the beam to sensor and a second position to direct the beam photographic film. The central processor controls the moveable mirror to the first position and obtains a first light intensity output from the sensor and calculates a first exposure time. The central processor then controls the movable mirror to the second position and opens the shutter to expose the film for the first exposure time. The processor controls the moveable mirror to obtain a second light intensity and determines if additional exposure time is necessary. If additional exposure time is necessary, the central processor calculates the additional exposure time and controls the apparatus to expose the film for the second exposure time. This process may be repeated as necessary to obtain the desired overall exposure.

Further objects, features and advantages of the invention will become apparent from the detailed description of preferred embodiments that follows, when considered together with the attached figures of drawing.

BRIEF DESCRIPTION OF THE DRAWINGS

The invention will be described in greater detail with reference to the accompanying drawings in which.

DETAILED DESCRIPTION OF THE
PREFERRED EMBODIMENTS

The fading effect exhibited in a florescent preparation is subject to known laws. As a result, the reduction in intensity of the light during exposure does not need to be measured continuously. In most instances, two time-shifted measurements of the intensity are sufficient to determine the progression of the fading effect. The light intensity decreases according to the formula $$I_{(t)} = I_{(o)} \times \exp^{(-t/\tau)}$$

in which $I_{(t)}$ signifies the total intensity, $I_{(o)}$ signifies the initial intensity, t signifies the time and $\tau$ signifies a time constant, then $I_{(o)}$ and $\tau$ are unknown in the formula. The total time progression of the reduction of intensity can thus be determined by measuring two intensity values, namely $I_1$ and $I_2$ with the time interval $T_t$. In this manner, the exposure $$\Phi_1 = \int_0^{T_1} I_{(t)} dt$$

can also be computed by means of the values $I_1$, $I_2$ and $T_1$.

By measuring the intensity both before and after the first exposure process, the actual exposure $\Phi_1$ can be determined using the above-described fading progression. The first exposure $\Phi_1$ is shorter than the theoretical exposure $\Phi_{theoretical}$, which is the optimal exposure for the film being used. Since further fading will continue to follow the known fading progression, a second exposure time $T_2$ can be determined, according to the equation: $\Phi_1 = \Phi_2 = \phi_{theoretical}$. (In other words, $\Phi_2$ can be calculated as $(\Phi_{theoretic} - \Phi_1)$ and $T_2$ can be computed using $\Phi_2$ in the above exposure formula. In this case, $T_2$ is a function of $I_1$, $I_2$ and $T_1$, i.e. $T_2 = F(I_1, I_2, T_1)$. Since the measurement time for measuring the second intensity $T_2$ is substantially less than the exposure times (i.e., $T_1$ and $T_2$), it can be ignored in the calculation of the second exposure time.

Figure 1:
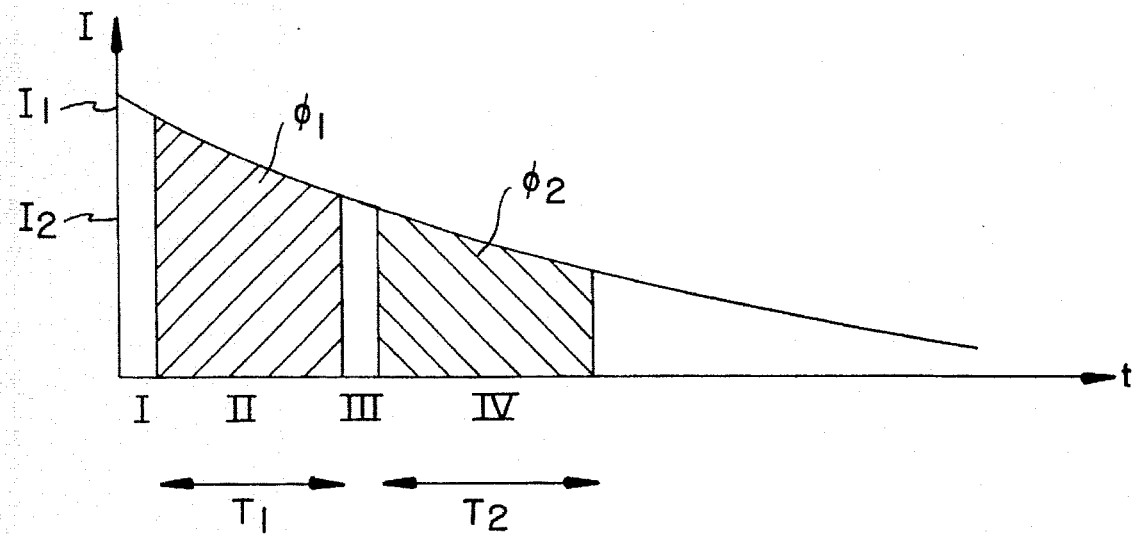
FIG. 1 is a graph of intensity versus time of the various stages according to one embodiment of the instant invention.

FIG. 1 depicts the various stages in the above described exposure progression. In stage I an initial intensity $I_1$ is measured and a first exposure time $T_1$ is determined. In stage II a first exposure takes place over the time $T_1$. In stage III the intensity $I_2$ is measured at the completion of the first exposure time $T_1$ and a determination is made whether a second exposure time is required and, if so, a second exposure time $T_2$ is calculated. A second exposure time may be triggered based on a predetermined relationship of $I_1$ and $I_2$. For example, the system may be programmed to indicate that a reexposure with an exposure time $(T_2)$ should be performed if $I_2/I_1$ is between 0.2 and 0.8. Finally, in stage IV a second exposure is undertaken over the computed time $T_2$.

According to the above process, the maximum quantity of available light passes to the film during the exposure times. Thus, the overall exposure time is greatly reduced as compared to prior methods using a beam splitter. Further, the full quantity of light is passed to the sensor to calculate the exposure and to correct for fading. Since a beam splitter is not used during the exposure of the film, a reduction of the imaging quality associated therewith is also eliminated.

Figure 2:
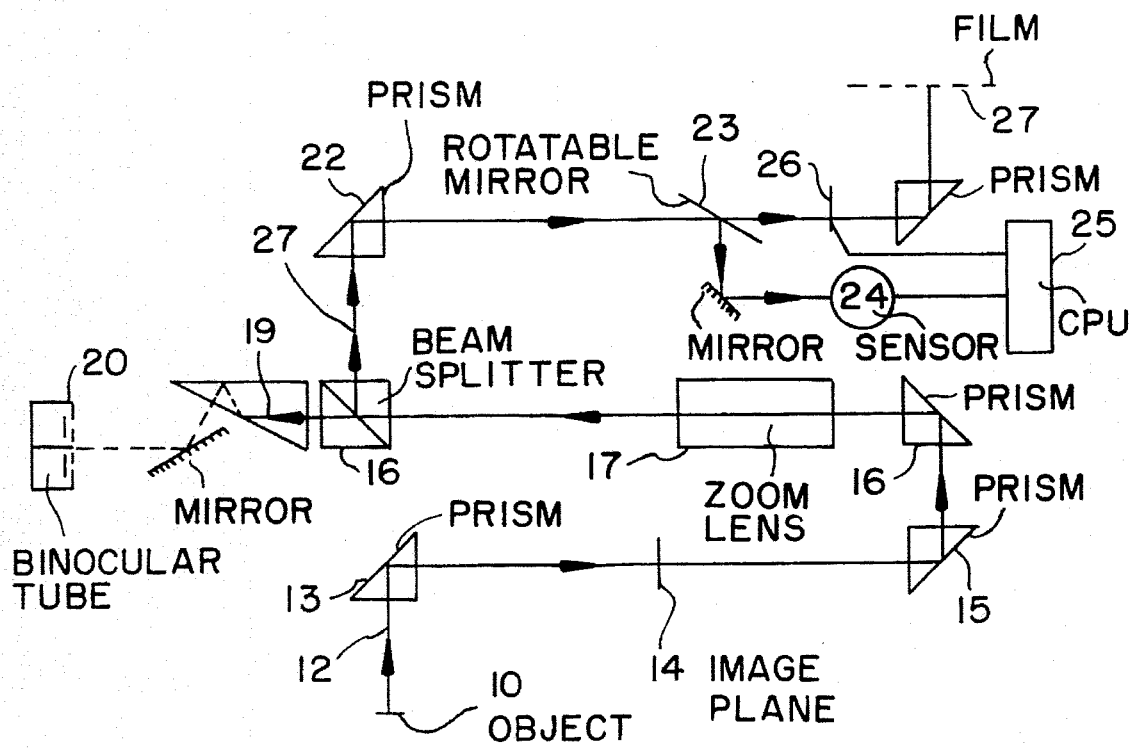
FIG. 2 shows a block diagram of the device for performing florescence microphotography according to one embodiment of the invention.

A device for carrying out the microphotography according to one embodiment of the instant invention will be described with reference to FIG. 2. In FIG. 2, a beam 12 emanates from an object 10 to be investigated. The beam 12 is deflected by a prism 13 forming an intermediate image of the object 10 in an intermediate image plane 14, in which, for example, a reticle (not shown) may be disposed. The beam 12 is deflected by prisms 15 and 16 through a zoom lens system 17. Zoom lens system 17 may comprise, for example, an image-deflecting tube lens system. The output from the zoom lens system 17 is divided by a beam splitter 18 having adjustable splitting ratios. Beam splitter 18 directs part of beam 12, via beam path 19, to binocular tube 20 for observation by an operator. The remaining portion of beam 11 is directed along a photographic beam path 21 for use in the photographic process. The portion of the beam following beam path 21 is deflected by prism 22 to the location of the rotatable mirror 23.

Operation of the device according to one embodiment of the invention will now be described. During stages I and III (depicted in FIG. 1), measurements of intensity is carried out by causing the rotatable mirror 23 to be placed in the beam path. The rotatable mirror 23 directs all of the light of the photographic beam path 21 onto a sensor 24, which measures the intensities. The sensor 24 may comprise, for example, a selected multiplier or any other suitable sensor. A central processor 25, receives the intensity values from the sensor 24 and computes the corresponding exposure times. In order to expose the photographic film 27, the rotatable mirror 23 and a shutter 26 are controlled by the central processor 25 so that the rotatable mirror 23 is swung out and all of the light of the photographic beam path 21 passes to the photographic film 27.

Figure 3:
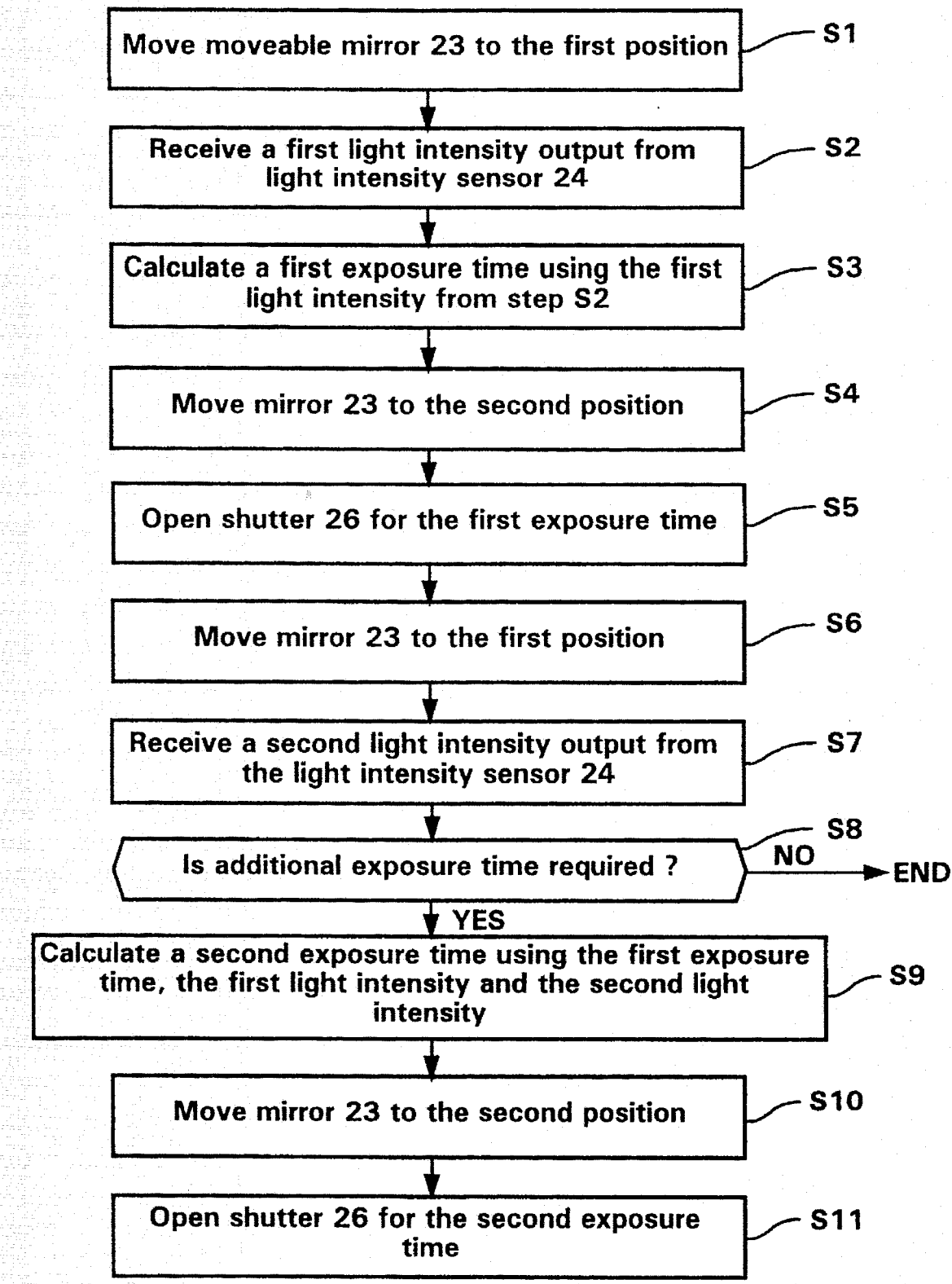
FIG. 3 is a flow diagram illustrating the control operations performed by the central processor of the instant invention.

FIG. 3 is a flow diagram illustrating the control operations performed by the central processor 25 of the instant invention. In step S1, moveable mirror 23 is moved to the first position. In step S2, the processor receives a first light intensity output from light intensity sensor 24. In step S3, the processor calculates a first exposure time using the first light intensity from step S2. In step S4, mirror 23 is moved to the second position. In step S5, shutter 26 is opened for the first exposure time. In step S6, mirror 23 is moved to the first position. In step S7, the processor 25 receives a second light intensity output from the light intensity sensor 24. In step S8, the processor determines whether additional exposure time is required. If additional exposure time is required, the processor 25 calculates a second exposure time in step S9 using the first exposure time, the first light intensity, and the second light intensity and moves mirror 23 to the second position in step S10. In step S11, the shutter 26 is opened for the second exposure time.

It is understood that other types of functions may also be applicable for time progression predictions of the fading effect. Under certain fading progressions, a precise determination of the reexposure time $T_2$ may not be possible, since certain types of functions are not distinguishable by measurement at individual positions or when the functions exhibit more than two parameters. However it is still possible to calculate an exposure $\Phi_2$ as function of $I_1$, $I_2$, $T_1$ and $T_2$ for the respective types of functions to select an optimized interrelationship for the computation of $T_2$. Although the second exposure time $T_2$ determined in this manner represents only an approximation, it is in many cases sufficient to control correct exposures according to the above described aspects of the invention. For example, the function employed may be F $(I_1, I_2, T_1, \alpha)$, in which e signifies the Schwarzschild exponent.

Further, while the disclosed embodiment describes the invention in the context of fluorescence microphotography, it should not be construed to limit the invention. For example, the process could be used for any type of microphotography where the intensity of light emanated from the object undergoing microphotography changes over time at a predictable rate.

The instant invention is not limited to two exposures. It is readily apparent that after the second exposure time an additional intensity measurement can be taken by the sensor. This measurement can be used along with the previous exposure times and intensities to calculate an additional exposure time. In this manner, any number of actual exposure times can be used.

What is claimed is:

1. A method for controlling exposure for microphotography of an object having a luminous intensity which changes over time, said method comprising the steps of:

directing a photographic beam of a microscopic luminous image of said object to a sensor;

measuring a first intensity value of said photographic beam;

determining a first exposure time based on said first intensity value;

directing said photographic beam onto a photographic film;

exposing said photographic film for said first exposure time;

directing said photographic beam a second time to said sensor to measure a second intensity value;

determining whether additional exposure is required; and if said determining step indicates additional exposure time is required calculating a second exposure time using said first intensity value, said first exposure time and said second intensity value; and exposing said photographic film for said second exposure time.

2. A method as recited in claim 1, wherein said object has a fluorescence luminosity.

3. A method as recited in claim 1, wherein said determining step indicates that additional exposure is required when a ratio of said second intensity value to said first intensity value is between 0.2 and 0.8.

4. A method as recited in claim 1, wherein said calculating step is performed as a function of said first intensity value, said first exposure time, said second intensity value and a Schwarzschild exponent.

5. A method as recited in claim 1, further comprising the steps of:

directing said photographic beam a third time to said sensor to measure a third intensity value;

determining whether a third exposure is required; and if said determining step indicates said third exposure is required, calculating a third exposure time using said first intensity value, said first exposure time, said second intensity value, said second exposure time and said third intensity value; and exposing said photographic film for said third exposure time.

6. A method as recited in claim 4, further comprising the steps of:

measuring 4-th through N-th intensity values, said N-th intensity value being an intensity value for which said determining step indicates that additional exposure time is not required;

calculating 4-th through (N–1)-th exposure times in the same manner as said third exposure time; and exposing said photographic film for said 4-th through said (n–1)-th exposure times.

7. An apparatus for controlling exposure of a photographic film in the microphotography of an object having a luminous intensity which changes over time, comprising:

a photographic tube, said photographic tube directing an image of said object along a photographic beam path to a movable mirror plane;

a movable mirror located in said movable mirror plane;

a shutter disposed between said moveable mirror plane and said photographic film;

a light intensity sensor;

a central processor connected to control said movable mirror and said shutter, said central processor further connected to receive an output from said light intensity sensor;

said movable mirror having a first position to direct said photographic beam path to be incident upon said sensor and a second position to direct said photographic beam path to be incident upon said photographic film; and said central processor controlling said moveable mirror to said first position and receiving a first light intensity output from said light intensity sensor, calculating a first exposure time using said first light intensity, controlling said movable mirror to said second position and opening said shutter for said first exposure time, controlling said moveable mirror to said first position and receiving a second light intensity output from said light intensity sensor, determining whether additional exposure time is required, and when said additional exposure time is required, calculating a second exposure time using said first exposure time, said first light intensity and said second light intensity, and further controlling said movable mirror to said second position and opening said shutter for said second exposure time.

8. An apparatus as recited in claim 7, wherein said object has a fluorescence luminosity.

9. An apparatus as recited in claim 7, wherein said sensor is a selected multiplier.

10. An apparatus as recited in claim 7, wherein said central processor repeatedly controls said moveable mirror and said shutter N times until an n-th intensity has a predetermined relationship with said first through an (n–1)-th light intensity measured intensities and said first through an (n–1)-th exposure time.

11. A apparatus for controlling exposure of a photographic film in the microphotography of an object having a luminous intensity which changes over time, comprising:

photographic means for directing a photographic image beam of said object along a photographic beam path to a predetermined plane;

a shutter disposed between said plane and the photographic film;

a light intensity sensor;

a selective beam deflector, located in said plane, for deflecting said photographic image beam out of said beam path, said beam deflector having a first position to direct said photographic image beam to be incident upon said sensor and a second position to direct said photographic image beam to be incident upon the photographic film; and control means, including a central processor connected to control said beam deflector and said shutter, and connected to receive an output from said light intensity sensor, for controlling said moveable mirror to said first position and receiving a first light intensity output from said light intensity sensor, for calculating a first exposure time using said first light intensity, for controlling said beam deflector to said second position and opening said shutter for said first exposure time, for controlling said beam deflector to said first position for at least a second time and receiving at least second light intensity output from said light intensity sensor, for determining whether additional exposure time is required based on said at least second light intensity, and when said additional exposure time is required, for calculating a second or subsequent exposure time using said first exposure time, said first light intensity and all light intensities and exposure times subsequent to said first exposure, and further controlling said beam deflector to said second position and opening said shutter for said second or subsequent exposure time.

* * * * *